(12) United States Patent
Wahrenberg

(10) Patent No.: US 12,154,216 B2
(45) Date of Patent: Nov. 26, 2024

(54) RENDERING METHOD AND APPARATUS

(71) Applicant: CANON MEDICAL SYSTEMS CORPORATION, Otawara (JP)

(72) Inventor: Magnus Fredrik Wahrenberg, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 214 days.

(21) Appl. No.: 17/807,993

(22) Filed: Jun. 21, 2022

(65) Prior Publication Data

US 2023/0410411 A1 Dec. 21, 2023

(51) Int. Cl.
*G06T 15/08* (2011.01)
*G06T 19/20* (2011.01)

(52) U.S. Cl.
CPC ............ *G06T 15/08* (2013.01); *G06T 19/20* (2013.01); *G06T 2200/24* (2013.01); *G06T 2210/41* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 10,055,878 B2 * | 8/2018 | Engel | G06F 12/0875 |
| 10,755,474 B1 | 8/2020 | Schneider | |
| 2014/0125668 A1 * | 5/2014 | Steed | G06T 19/006 |
| | | | 345/426 |
| 2014/0232719 A1 | 8/2014 | Wahrenberg | |
| 2017/0039773 A1 * | 2/2017 | Steed | G06T 15/50 |
| 2017/0294042 A1 | 10/2017 | Engel | |
| 2018/0174355 A1 * | 6/2018 | Day | G09G 5/40 |
| 2018/0330538 A1 | 11/2018 | Petkov | |
| 2020/0051319 A1 | 2/2020 | Wahrenberg | |
| 2020/0193695 A1 | 6/2020 | Dingeldey | |

* cited by examiner

*Primary Examiner* — Saptarshi Mazumder
(74) *Attorney, Agent, or Firm* — Oblon, McClelland, Maier & Neustadt, L.L.P.

(57) ABSTRACT

A medical image processing apparatus comprises processing circuitry configured to: receive a selection of a preset transfer function that sets colors used in volume rendering, wherein the preset transfer function is selected for use in rendering at least one target material; determine a first transfer function relating to transmission or extinction color, wherein the determining of the first transfer function is based on the preset transfer function; generate first rendering data based on transmission or extinction color by using the first transfer function; and determine a second transfer function relating to reflection color, wherein the determining of the second transfer function is based on the first rendering data, wherein the first transfer function and second transfer function are for use in global illumination rendering.

18 Claims, 6 Drawing Sheets

RENDERING METHOD AND APPARATUS

FIELD

Embodiments described herein relate generally to a method of, and apparatus for, determining transfer functions for use in rendering, for example in global illumination rendering.

BACKGROUND

It is known to render images from volumetric imaging data, for example from volumetric medical imaging data. A set of volumetric imaging data may be referred to as an image volume. The set of volumetric imaging data may comprise a plurality of voxels with associated intensities, with each voxel being representative of a corresponding spatial location in a medical imaging scan.

Direct Volume Rendering (DVR) is a method for volume rendering. DVR may be considered to be an industry standard for volume rendering.

DVR renders a volumetric imaging data set by modelling a cloud of emissive material. Each point in a volume represented by the volumetric imaging data set is assigned properties of color and opacity. Color may be expressed as a color value that comprises values for a plurality of color channels. For example, color may be expressed as an RGB color value that comprises respective values for red (R), green (G) and blue (B) color channels. The values for red, green and blue color channels may be described as a red value, a green value and a blue value respectively. Red, green and blue values may be expressed as numerical values between 0 and 255. Opacity may be expressed as a value A or Alpha, which is a measure of opacity in which a value of 0% indicates transparency and a value of 100% indicates full opacity.

The term preset may be used to refer to a mapping of intensity values to color values and opacity values. For example, in DVR a preset may comprise a single transfer function that maps color and opacity values to intensity values. The transfer function may be stored as a table. In some circumstances, different presets comprising different transfer functions may be selected for use in rendering different target materials. For example, a first preset may be used to render an image of vessels, and a second, different preset may be used to render an image of bone.

DVR rendering may be unshaded and may comprise only an accumulation of colors from the volumetric data set via the transfer function, or using more than one transfer function if segmentation is performed and different transfer functions are used for different materials. Shading may be added to the direct volume rendering, for example local shading using a local gradient computation. The term Shaded Volume Rendering (SVR) may be used to refer to direct volume rendering in which shading is used.

Global illumination (GI) is a further method for volume rendering. GI rendering has more degrees of freedom than conventional DVR rendering. In GI, a lighting model may be used that includes both direct illumination by light coming directly from a light source and indirect illumination, for example illumination by light that has been scattered from another surface.

Typically, GI rendering uses two transfer functions that each map intensity values to color and opacity. One transfer function determines a transmission or extinction color. Another, different transfer function determines a reflection color. The two transfer functions may be considered to relate to different manifestations of a similar type of process in the material, where transmission and reflection have different statistics at a macro level.

Transmission of light represents how much light makes it through a voxel, and is a function of absorption and scattering. Absorption and scattering may be considered to be bulk processes that occur over a relatively large scale. Transmission, which is representative of an amount of light that is transmitted, may alternatively be expressed as extinction, which is representative of an amount of light that is not transmitted.

Reflection may be considered to occur at a micro scale at a surface. If white light hits a surface within a voxel, usually there is a complex path of reflection events along that surface. The reflection events may relate to surface features that occur at a small scale, for example at a micrometer scale. Characteristics of the small scale surface features may determine a look of the reflection, for example a color of reflection and/or how diffuse the reflected light is. Pigments may comprise tiny particles which absorb light in a characteristic manner. A color of the reflection may be dependent on a chance of a photon hitting a particle around its path. A look of the reflection may dependent on how porous the surface material is, and therefore how much the light bounces around at the surface.

FIG. 1 is a schematic diagram representing reflection and transmission occurring at a single voxel 10. Light is incident on the voxel 10 as shown by arrow 12. A proportion of the incident light is reflected as shown by arrow 14. The reflection may be due to the presence of a surface within voxel 10. A reflection transfer function is used to obtain a first color in relation to the reflection from voxel 10. The first color is represented in box 16. The reflection transfer function may be considered to define an albedo.

A further proportion of the incident light is transmitted through voxel 10 as shown by arrow 18. A transmission transfer function, which is different from the reflection transfer function, is used to obtain a second color in relation to the transmission through voxel 10. The second color is represented in box 20.

Transmission color in GI has a different effect to color in regular DVR. In DVR, attenuation is approximated using alpha blending in which a single channel opacity is used to accumulate each color channel. In GI, there is a cumulative effect across the medium. For example, if there is a medium in which slightly more red light is transmitted than light of other colors, the light will be increasingly shifted towards red. Because of this cumulative effect, transmission colors in GI typically require high precision and it may be different to edit transmission colors manually to obtain a desired effect.

The creation of presets for GI may typically present challenges. The reflection transfer function and transmission transfer function interact to provide a final rendered effect. The transmission transfer function provides interior illumination of a resulting image, and determines how light propagates in and out of an object. The reflection transfer function provides tinting of the surface. Good images may make use of presets that have been designed by a specialist team that includes experts with detailed understanding of the rendering process in combination with clinical experts.

In some circumstances, a user may wish to obtain a new preset in GI that has a similar look and feel to an existing preset that is used for DVR. The user may perform a naïve conversion of the DVR preset. For example, the naïve conversion may comprise copying a transfer function from the DVR preset to obtain each of the reflection transfer function and transmission transfer function of the GI preset, where transmission is monochromatic and proportional to opacity. However, it has been found that such a naïve conversion may be sub-optimal. For example, the use of color on a surface may make it look plasticky, artificial or flat. Vessels may have an unnatural appearance. The user may be driven towards a mediocre image quality.

In general, users of GI rendering systems may find it very difficult to create new presets that provide high quality images.

SUMMARY

In a first aspect, there is provided a medical image processing apparatus comprising processing circuitry configured to: receive a selection of a preset transfer function that sets colors used in volume rendering, wherein the preset transfer function is selected for use in rendering at least one target material; determine a first transfer function relating to transmission or extinction color, wherein the determining of the first transfer function is based on the preset transfer function; generate first rendering data based on transmission or extinction color by using the first transfer function; and determine a second transfer function relating to reflection color, wherein the determining of the second transfer function is based on the first rendering data, wherein the first transfer function and second transfer function are for use in global illumination rendering.

The processing circuitry may be further configured to: receive volume data for volume rendering, wherein the volume data is representative of a region comprising the at least one target material. The processing circuitry may be further configured to perform a global illumination rendering process on the volume data using the first transfer function and second transfer function to obtain second rendering data, thereby to obtain a rendered image.

The generating of the first rendering data may comprise conducting at least one lighting simulation based on the first transfer function. The at least one lighting simulation may comprise a respective lighting simulation for each of a plurality of elements in the first transfer function, each element corresponding to a respective intensity value. Each lighting simulation may comprise simulation of attenuation of light by transmission through a geometric shape.

The geometric shape may comprise a rounded corner. The geometric shape may comprise a portion of a circle. The geometric shape may comprise a quarter of a circle. The geometric shape may comprise a triangle. The geometric shape may comprise a square.

The light may be incident at a predetermined angle relative to the geometric shape. The predetermined angle may be 45 degrees. The predetermined angle may be 90 degrees.

Each lighting simulation may comprise evaluation of a fixed rendering integral. The evaluation of the fixed rendering integral may be analytical. The evaluation of the fixed rendering integral may be partially analytical.

The processing circuitry may be further configured to display a plot to a user. The plot may be based on the first rendering data. The plot may be a plot of color attenuation and/or light penetration depth against intensity value.

The processing circuitry may be further configured to display to a user a representation of color attenuation and/or light penetration depth for a selected intensity value. The representation may be based on the first rendering data.

The determining of the first transfer function may comprise applying a first saturation constraint to color values in the first transfer function. The applying of the first saturation constraint may comprise adjusting saturation of at least some color values in the first transfer function. The adjusting of the saturation may be based on opacity.

The determining of the second transfer function may comprise applying a second saturation constraint to color values in the second transfer function. The applying of the second saturation constraint may comprise setting a respective color limit for each of a plurality of color values in the reflection transfer function. The setting of the color limits may be based on opacity. The setting of the color limits may comprise applying a respective saturation margin to each of the plurality of color values in the reflection transfer function. The saturation margins may be dependent on opacity.

The processing circuitry may be further configured to identify any color values in the preset transfer function having at least one color channel that is below a minimum color value. The processing circuitry may be further configured to adjust the identified color values such that each color channel is above the minimum color value. The processing circuitry may be configured to adjust the identified color values such that each color channel is above the minimum color value over a predetermined range of saturation.

The processing circuitry may be further configured to identify any color values in the preset transfer function having at least one color channel that is above a maximum color value. The processing circuitry may be further configured to adjust the identified color values such that each color channel is below the maximum color value. The processing circuitry may be configured to adjust the identified color values such that each color channel is below the maximum color value over a or the predetermined range of saturation.

The preset transfer function may be configured for use in shaded volume rendering.

The at least one target material may comprise at least one of: tissue, bone, vessel, organ.

In a further aspect, which may be provided independently, there is provided a method comprising: receiving a selection of a preset transfer function that sets colors used in volume rendering, wherein the preset transfer function is selected for use in rendering at least one target material; determining a first transfer function relating to transmission or extinction color, wherein the determining of the first transfer function is based on the preset transfer function; generating first rendering data based on transmission or extinction color by using the first transfer function; and determining a second transfer function relating to reflection color, wherein the determining of the second transfer function is based on the first rendering data, wherein the first transfer function and second transfer function are for use in global illumination rendering.

In a further aspect, which may be provided independently, there is provided a medical image processing apparatus comprising processing circuitry to: receive volume data for volume rendering, specify a preset transfer function relating to color setting in volume rendering based on the target included in the volume data, determine a first transfer function relating to transmission/extinction color based on the preset transfer function, generate first rendering data based on transmission color by using the first transfer function, determine a second transfer function relating to reflection color based on the first rendering data, render a second rendering data based on the first and second transfer function by global illumination rendering process.

The processing circuitry may be further configured to: generate the first rendering data by conducting a lighting simulation based on the first transfer function.

The processing circuitry may be further configured to: determine the second transfer function further based on a saturation constraint relating to color determined by the preset transfer function.

The processing circuitry may be further configured to: determine the first transfer function further based on a saturation constraint relating to color determined by the preset transfer function.

The preset transfer function may be relating to shaded volume rendering.

In a further aspect, which may be provided independently, there is provide a method to convert existing presets to GI comprising a single input color table or color control points; output reflection+extinction or transmission table; a saturation constraint limiting the similarity of the reflection color and the target color from (A) the source color; a fixed rendering integral representing a rounded corner (or other geometry) GI attenuation simulation (B); In which constrained input colors are loaded into the transmission table and the simulation in B executed, whereby the reflection color is chosen to make the output match the source color as far as the constraint in (A) allows.

Source colors may be additionally adjusted to avoid RGB primary colors across a set range of color saturation.

The geometry may be analytically or partly analytically evaluated based on a fixed light incidence angle (for example 45 degrees or 90 degrees).

The transmission conversion may happen first and may be shown to the user (using a plain reflection function) in order to reinforce the GI preset workflow.

The simulation result may be shown as a diagram of color attenuation and light penetration depths.

Bars may be shown containing the attenuation profile of real world tissues/materials.

In a further aspect, which may be provided independently, there is provided a method comprising: receiving a pre-set transfer function, for example wherein the pre-set transfer function comprises a color table or a set of color control points; and using the pre-set transfer function to determine a reflection transfer function, for example a reflection table, and a transmission or extinction transfer function, for example a transmission or extinction table, for use in global illumination rendering; wherein the determining of the reflection transfer function comprises using a saturation constraint and performing a lighting simulation.

The saturation constraint may limit a similarity between a reflection color of the reflection transfer function and a corresponding color of the transmission or extinction transfer function and/or a corresponding color of the pre-set transfer function and/or a corresponding color obtained by rendering using the reflection transfer function and the transmission or extinction transfer function.

A color of the reflection transfer function may be chosen to make a pixel rendered using the reflection transfer function and transmission or extinction transfer function in global illumination have a similar color to a corresponding pixel rendered using the pre-set transfer function in shaded volume rendering.

The lighting simulation may comprise a simulation of a predetermined geometrical shape, optionally wherein the predetermined geometrical shape comprises a rounded corner.

The lighting simulation may comprise evaluating a fixed rendering integral.

The lighting simulation may comprise an analytical or partially analytical evaluation.

The lighting simulation may comprise evaluating the fixed rendering integral based on a fixed light incidence angle, for example 45 degrees or 90 degrees.

The lighting simulation may comprise an attenuation simulation.

The method may further comprise adjusting colors of the reflection transfer function and/or transmission or extinction transfer function to avoid RGB primary colors across a saturation range.

The method may further comprise adjusting colors of the reflection transfer function and/or transmission or extinction transfer function such that each color channel is greater than a minimum value across a saturation range of an HSV equivalent color.

A minimum saturation margin for each reflection color of the reflection transfer function may be based on opacity.

The method may further comprise displaying to a user an image rendered using a determined transmission or extinction transfer function and a plain reflection function.

The method may further comprise displaying to a user a result of the lighting simulation as a diagram of color attenuation and light penetration depths.

The method may further comprise displaying to a user an attenuation profile of a material rendered in accordance with the determined reflection transfer function and transmission or extinction transfer function, optionally wherein the material is a real world material, further optionally wherein the material is a tissue.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF THE DRAWINGS

Embodiments are now described, by way of non-limiting example, and are illustrated in the following figures, in which.

DETAILED DESCRIPTION

Figure 1:
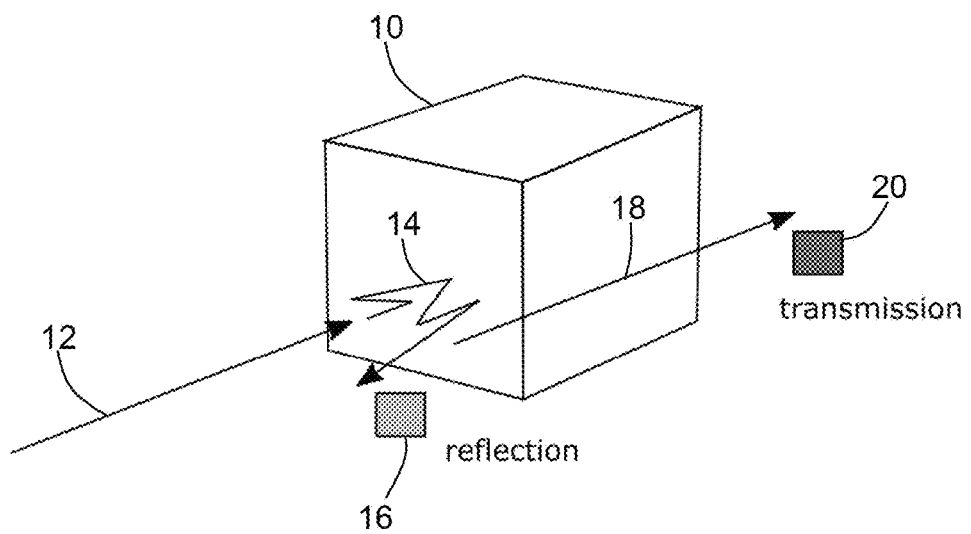
FIG. 1 is a schematic illustration of reflection and transmission for a voxel.
Figure 2:
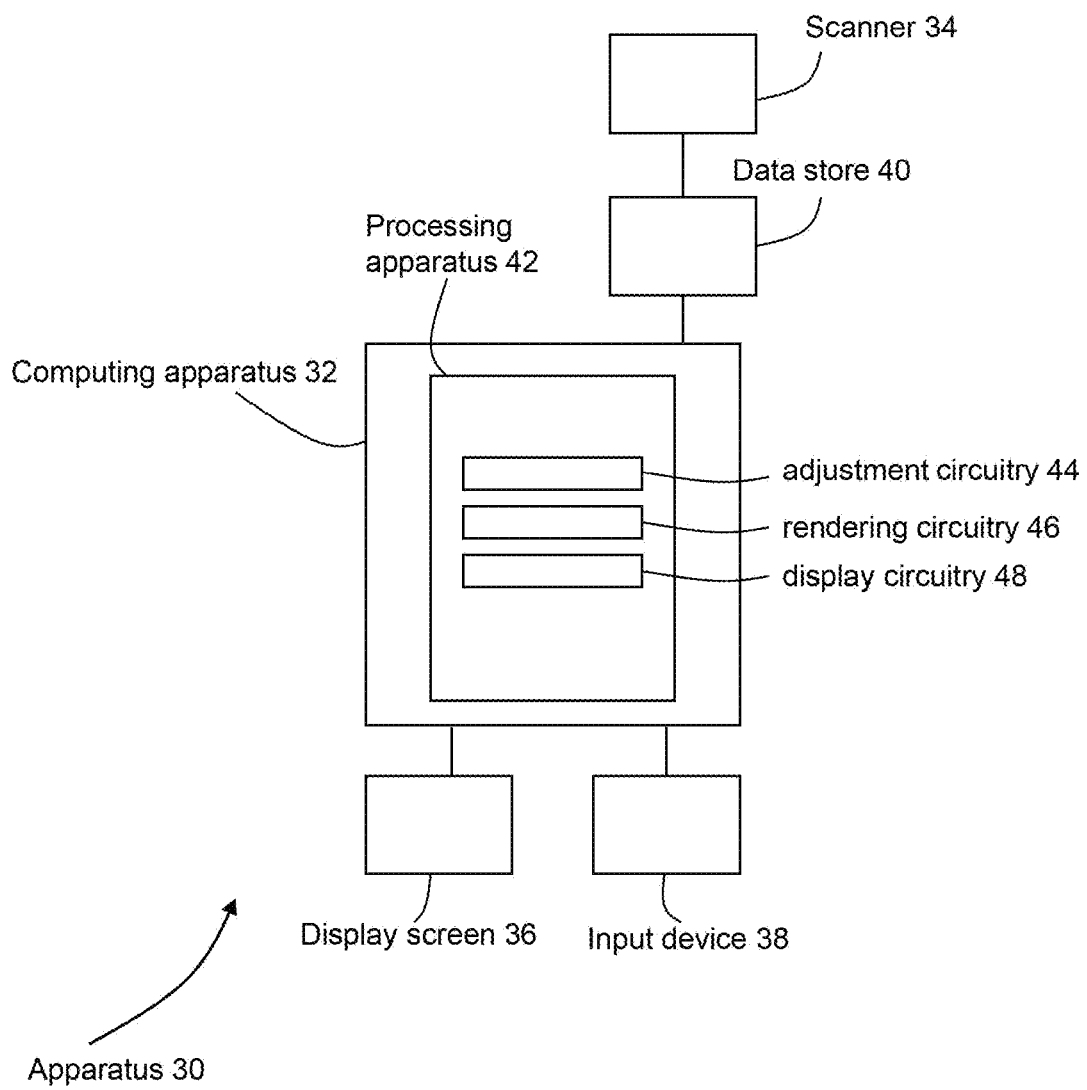
FIG. 2 is a schematic illustration of an apparatus in accordance with an embodiment.

A medical image processing apparatus 30 according to an embodiment is illustrated schematically in FIG. 2. The medical image processing apparatus 30 comprises a computing apparatus 32, in this case a personal computer (PC) or workstation, which is connected to a scanner 34 via a data store 40.

The medical image processing apparatus 30 further comprises one or more display screens 36 and an input device or devices 38, such as a computer keyboard, mouse or trackball.

In the present embodiment, the scanner 34 is a CT (computed tomography) scanner which is configured to obtain volumetric CT scans. The scanner 34 is configured to generate image data that is representative of a volume comprising at least one anatomical region of a patient or other subject. The image data represents a plurality of voxels each having a corresponding image data value, which in the case of CT scanning is an intensity value, for example a value in Hounsfield units. In other embodiments the image data represents a plurality of pixels instead of a plurality of voxels.

In further embodiments, the scanner 34 may be configured to obtain two-, three- or four-dimensional image data in any imaging modality. For example, the scanner 34 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 34 are stored in data store 40 and subsequently provided to computing apparatus 32. In an alternative embodiment, image data sets are supplied from a remote data store (not shown). The data store 40 or remote data store may comprise any suitable form of memory storage. In some embodiments, the medical image processing apparatus 30 is not coupled to any scanner.

Computing apparatus 32 comprises a processing apparatus 42 for processing of data. The processing apparatus comprises a central processing unit (CPU) and Graphical Processing Unit (GPU). The processing apparatus 42 provides a processing resource for automatically or semi-automatically processing medical image data sets. In other embodiments, the data to be processed may comprise any image data, which may not be medical image data.

The processing apparatus 42 includes adjustment circuitry 44 which is configured to adjust transfer function values; rendering circuitry 46 which is configured to rendering images from volumetric image data; and display circuitry 48 which is configured to display results and images to a user.

In the present embodiment, the circuitries 44, 46, 48 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 32 also includes at least one storage device, for example a hard drive, and other components of a PC including RAM, ROM, a data bus, an operating system including various device drivers, and hardware devices including a graphics card. Such components are not shown in FIG. 2 for clarity.

Figure 3:
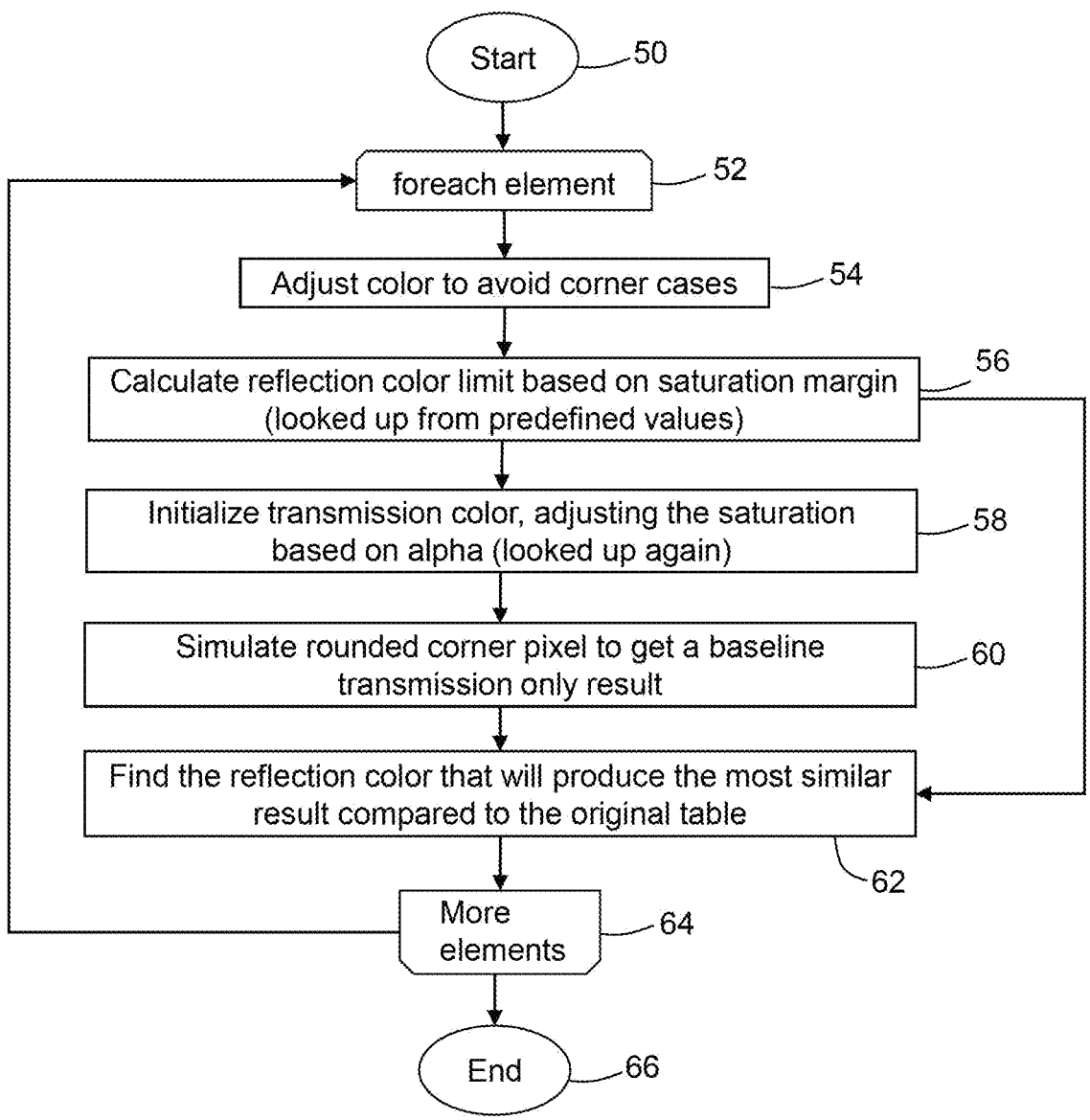
FIG. 3 is a flow chart illustrating in overview a method in accordance with an embodiment.

The apparatus of FIG. 2 is configured to perform a method as described below with reference to FIG. 3. The method of FIG. 3 provides a method of creating presets for GI that makes use of an understanding about the reflection transfer function and the transmission transfer function, and a knowledge that the reflection transfer function and the transmission transfer function are complementary and not independent. Transmission properties are determined while letting the transmission properties have as much contribution as possible. Then a hypothetical lighting situation is simulated based on transmission and a reflection transfer function is determined based on the simulation. Constraints are applied to achieve a good image.

At stage 50, the method of FIG. 3 starts. The adjustment circuitry 44 receives a DVR preset, for example from the data store 40. The DVR preset is configured for rendering at least one target material. The at least one target material may comprise at least one type of tissue or anatomical structure. For example, the at least one target material may comprise bone, soft tissue, at least one vessel or at least one organ. The DVR preset may be selected by a user.

In the embodiment of FIG. 3, the DVR preset comprises a preset transfer function that sets colors and opacities used in volume rendering. The preset transfer function is stored in the form of a table. The table comprises a plurality of elements. Each element relates to a respective intensity value. Each intensity value has a corresponding color value, which in the embodiment of FIG. 3 is an RGB color value comprising red, green and blue values. In other embodiments, any suitable color representation may be used, for example HSL (hue, saturation, lightness) or HSV (hue, saturation, value).

In the embodiment of FIG. 3, the table comprises a respective element for every possible intensity value, for example for every integer value from 0 to 255. In other embodiments, the table comprises a respective element for each of a plurality of color control points from which values for other intensity values may be derived, for example by interpolation. The preset transfer function may be stored in any suitable manner, for example as a table, list or function.

At stage 52, the adjustment circuitry 44 selects one element in the preset transfer function and obtains from the preset transfer function a color value and opacity value corresponding to the intensity value for the selected element. The intensity value for the selected element may be referred to as a selected intensity value. The color value and opacity value corresponding to the selected intensity value may be referred to as a selected color value and a selected opacity value respectively.

At stage 54, the adjustment circuitry 44 determines whether the color that is represented by the selected color value is a primary color or is near to a primary color. In this context, a primary color may be a color that has a zero value in one or more of the color channels. In this embodiment, the channels are red, green and blue. A near primary color may be a color that has a near zero value, for example a value that is below a predetermined minimum value, in one or more of the color channels.

A zero value in a color channel may be very disruptive because any operation performed on the color value during rendering will not recover the color channel for which a zero value is present. The lack of a value in the color channel may limit the sense of richness and contrast in a final image.

If the selected color value is detected to be a primary or near primary color, the adjustment circuitry 44 adjusts the selected color value so that the value for each color channel is greater than a minimum threshold value. For example, in one embodiment the minimum threshold value may be 5% intensity. In other embodiments, the minimum threshold value may be 10%, 5%, 3%, 2% or 1% intensity, or any suitable threshold value.

In the embodiment of FIG. 3, the adjustment circuitry 44 obtains an equivalent color to the selected color value in a HSV (hue, saturation, value) color representation, and adjusts the selected color value so that each color channel is greater than a minimum threshold value across a saturation range of the HSV equivalent to the selected color value. The adjusting of the selected color value may be such that hue is maintained while saturation and value are changed, for example increased.

In the embodiment of FIG. 3, the adjustment circuitry 44 adjusts any color value in which one or more of the color channels has a value that is, or is close to, a maximum value for the color channel. For example, the adjustment circuitry 44 may adjust any color channel value that equal to 255, or is close to 255. In some circumstances, a color value that is a maximum value may have an undesirable effect on transparency. If the selected color value comprises one or more channels with a value that is equal to, or close to, a maximum value, the adjustment circuitry 44 may adjust the selected color value so that the value for each color channel is lower than a maximum threshold value. For example, the adjustment circuitry 44 may obtain equivalent color to the selected color value in a HSV (hue, saturation, value) color representation, and adjust the selected color value so that each color channel is lower than a maximum threshold value across a saturation range of the HSV equivalent to the selected color value. The adjusting of the selected color value may be such that hue is maintained while saturation and value are changed, for example decreased.

In the embodiment of FIG. 3, any color values having at least one color value that is very low (primary color) or very high may be considered to be a corner case that is in need of adjustment when converting the preset transfer function into transfer functions for global illumination. Color is adjusted to avoid such corner cases.

The adjustment circuitry 44 outputs an adjusted color value that incorporates any adjustments to the selected color value that were performed by the adjustment circuitry 44. If the color obtained from the preset transfer function was not detected to have any channel values below a minimum threshold value, or above a maximum threshold value, the RGB values of the adjusted color value are the same as the RGB values of the selected color value. If the color obtained from the preset transfer function was detected to have any channel values below a minimum threshold value, or above a maximum threshold value, the RGB values of the adjusted color value are those obtained by adjusting the selected color value, for example by increasing or decreasing saturation and/or value. For example, if the color value obtained from the preset transfer function was detected to be a primary or near primary color, the adjusted color comprises RGB values that have been adjusted as described above to exceed a minimum value across a saturation range.

In other embodiments, any suitable method may be used to detect and adjust any colors having any color channel that includes a very low value (for example, 0) or a very high value (for example 255). In further embodiments, the adjustment of stage 54 is omitted.

At stage 56, the adjustment circuitry 44 determines a minimum saturation margin for the selected element. In the embodiment of FIG. 3, the minimum saturation margin for the selected element is based on the opacity value for the selected element that was obtained from the preset transfer function at stage 52. The adjustment circuitry 44 determines the minimum saturation margin by looking up the opacity value in a table in which predefined minimum saturation margins are associated with opacity values. In further embodiments, any suitable method of determining minimum saturation margins may be used, for example using any suitable table, list or function to determine minimum saturation margins.

The minimum saturation margins may be such that a higher saturation is used for lower opacity elements and a lower saturation is used for higher opacity elements. For example, a larger saturation margin may be applied to an element having a high opacity value than to an element having a low or medium opacity value. If the opacity value is high, it is to be expected that an interior of an object rendered using that opacity value will be more saturated than if the opacity value was lower. A larger margin between a transmission color and a reflection color may be used to take account of the higher saturation of the interior.

The adjustment circuitry 44 uses the minimum saturation margin and the adjusted color value for the selected element to calculate a color limit on a reflection color for the selected element. For example, the adjustment circuitry 44 may add the minimum saturation margin to the adjusted color value to obtain the color limit.

The color limit will be later used in the generating of the reflection transfer function that is described below with reference to stage 64.

In order to achieve desired color gradients, a reflection color is selected to be some distance away in color space from an expected output color that would be seen in an SVR rendering. Selecting a reflection color that is some distance away from an expected output color may allow transmission to create complexity by saturating the colors. The use of a saturation margin may allow such distance between colors to be implemented. The use of a saturation margin applies a saturation constraint on reflection.

In the embodiment of FIG. 3, the color limit is based on the adjusted color value. In other embodiments, any suitable method of obtaining a color limit may be used. For example, an absolute maximum saturation value may be set for a saturation channel. The absolute maximum saturation value may not depend on opacity. In further embodiments, stage 56 may be omitted.

At stage 58, the adjustment circuitry 44 initializes a transmission color for the selected element with the selected color value from the SVR preset. If the selected color value has been adjusted at stage 54, the transmission color circuitry 46 initializes the transmission color with the adjusted color value that was obtained at stage 54.

The adjustment circuitry 44 obtains the selected opacity value for the selected element.

The adjustment circuitry 44 converts the initialized transmission color to HSV, where the initialized transmission color is the selected color value or adjusted color value as described above. The adjustment circuitry 44 then adjusts the saturation of the initialized transmission color in dependence on the selected opacity value. The adjustment circuitry 44 determines an amount by which the saturation is to be adjusted by looking up a table that relates saturation adjustment to opacity. In further embodiments, any suitable method of determining saturation adjustment may be used, for example using any suitable table, list or function to determine saturation adjustments.

In the embodiment of FIG. 3, an effect of the saturation adjustment is to increase saturation in low-opacity or lower-opacity regions of the transfer function, for example in regions having less than 40% opacity. In other embodiments, low- or lower-opacity regions may comprise regions having an opacity of less than 50%, less than 40%, less than 30%, less than 20% or less than 10%. Saturation is increased in low-opacity or lower-opacity regions because color and saturation may be particularly important in translucent areas in which opacity is low.

The adjustment circuitry 44 outputs a transmission color value for the selected intensity value, wherein the transmission color value is obtained by applying the saturation adjustment to the initialized transmission color.

At stage 60, the rendering circuitry 46 performs a lighting simulation using the transmission color value obtained at stage 58 and the selected opacity value. The lighting simulation simulates a hypothetical lighting situation, which is constructed to be a simple hypothetical example. The lighting simulation simulates incidence of light on a simple geometric shape made of a homogeneous material having transmission properties that are defined by the transmission color value obtained at stage 58 and the selected opacity value. Light is attenuated as it is transmitted through the homogeneous material.

In the embodiment of FIG. 3, the geometric shape is a rounded corner 70. The simulation comprises a simulation of light incident on the rounded corner 90 with a 45 degrees angle of lighting incidence. In other embodiments, any suitable geometric shape may be used, for example a triangle or square.

The rendering circuitry 46 calculates a radius r for the rounded corner 70 based on the opacity value for the selected element and on a visibility factor. For example, the visibility factor may be 95%, If the visibility factor is 95%, the radius r for the rounded corner is determined to be such that 95% of light is absorbed when passing through a full radius of the rounded corner. In other equations, the visibility factor may be any suitable value, for example 90%.

Equations 1 and 2 are representative of the calculation of the radius r using a visibility factor of 95%. The opacity value for the selected element is written as a. The opacity value is a value between 0 and 1. The relationship between the required radius r and the opacity value a may be written as:

$$(1-a)^r = 0.95 \qquad \text{(Equation 1)}$$

Equation 1 is then rearranged to calculate the radius:

$$\text{Radius} = r = \left[ \frac{\log\left(\frac{19}{20}\right)}{\log(1-\alpha)} \right] \qquad \text{(Equation 2)}$$

The radius r used in the lighting simulation may be different for different elements, because different elements may have different opacity, and the radius r is dependent on opacity.

Figure 4:
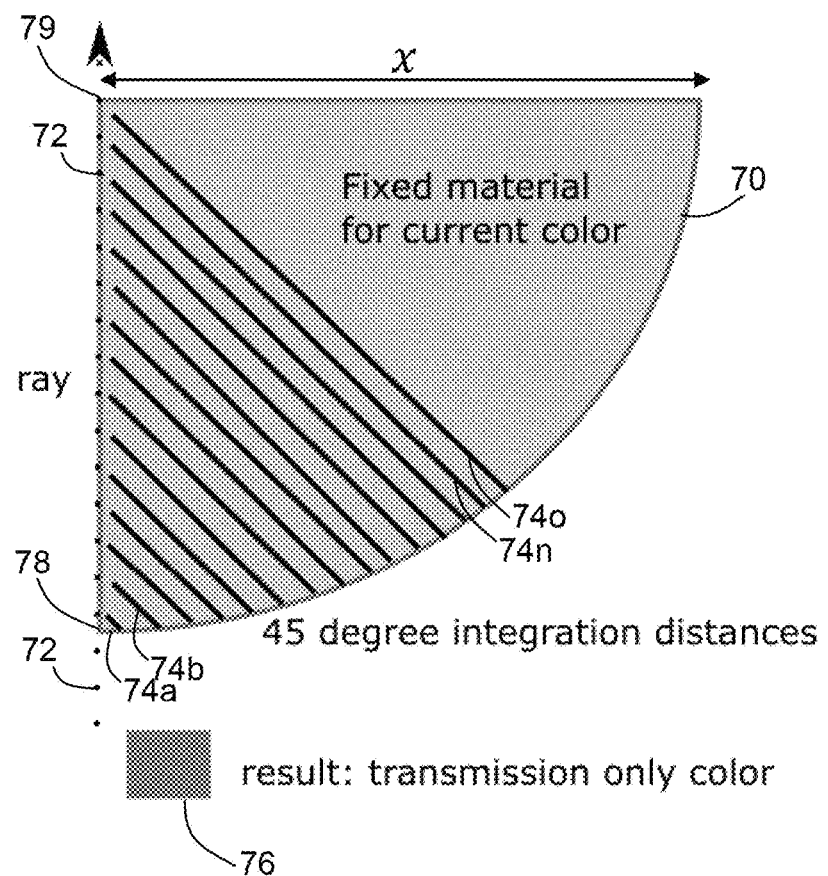
FIG. 4 is a schematic illustration representing a lighting simulation.

FIG. 4 is a schematic illustration of the simulation. A rounded corner 70 of radius r is pictured in FIG. 4. The rounded corner 70 has two straight edges at 90 degrees from each other and one arcuate edge, so as to form a quarter circle of radius r. Light is incident at an angle that is at angle of +45 degrees relative to a first one of the straight edges and −45 degrees relative to a second one of the straight edges. The incident light is shown as a set of parallel lines 74a, 74b . . . 74n, 74o.

The rounded corner 70 has a fixed material that corresponds to the selected element.

A ray 72 passes along one straight edge of the rounded corner and accumulates color for a single pixel, using transmission only and not reflection. The ray 72 is represented by a dotted-line arrow in FIG. 4. The ray 72 starts its accumulation at the outside of the rounded corner at a point 78 and proceeds through the rounded corner 70 to a corner point 79 where the two straight edges meet. The light is incident at a 45 degrees angle relative to the ray 72.

The lighting simulation is constructed so that it results in a fixed integral that can be evaluated using an analytical or partially analytical evaluation method. The use of a 45 degrees angle of incidence of the light allows a fixed integral to be created. In other embodiments, the use of a 90 degrees angle of incidence allows a fixed integral to be created. In some circumstances, a 45 degrees angle of incidence may be considered to be more representative of realistic lighting than a 90 degrees angle of incidence.

Equation 3 expresses a path length L(p, r) of incident light as a function of the radius r of the rounded corner and position p which is measured as a distance from a center point 79 of the rounded corner. A 45 degrees angle of incidence is assumed.

$$L(p,r) = \sqrt{r^2 - p} \sqrt{2r^2 - p^2} \qquad \text{(Equation 3)}$$

Once the path length as a function of radius and position is known, it is possible to set up an analytical expression for the whole ray (per channel), where t is the channel transmission (for example, red, green or blue transmission). Equation 4 is a rendering equation for the ray in which a is the opacity value, t is the transmission value for a given channel and r is the radius.

$$\text{Ray} = \int_0^r (1-a)^{r-p} t^{\sqrt{r^2-p} \sqrt{2r^2-p^2}} \qquad \text{(Equation 4)}$$

Equation 4 may be evaluated analytically or partially analytically. In some circumstances, it may be more convenient to solve the outer integral of Equation 4 numerically. In some embodiments, at least part of the calculation of Equation 4 may be precalculated and stored, for example in a table.

An output of the simulation of stage 60 is first rendering data comprising at least a color value for each color channel. The color values together may be considered to form a pixel color for the lighting simulation of FIG. 4. The pixel color may be described as a transmission only color. Only transmission is simulated using Equation 4.

A box 76 in FIG. 4 is representative of the color obtained by the lighting simulation, but is shown in greyscale for reasons of reproduction.

In the simulation of FIG. 4, pixel color is calculated using transmission color only. A reflection color is set to be completely white for all intensity values. Alternatively, a reflection color may be set to be completely uniform for all intensity values. In other embodiments, any suitable treatment of reflection color may be used in the simulation.

At the end of stage 60, the rendering circuitry 46 outputs the pixel color for the selected element which has been obtained using the lighting simulation. The lighting simulation may be considered to provide a baseline transmission-only result.

Simulating light from a 45 degrees incidence angle allows calculation using a fixed integral. A predetermined geometry is chosen that allows analytical evaluation. The use of a fixed integral may allow use of an easy algorithm to perform the simulation, which may also be a fast algorithm. In other embodiments, a 90 degrees incidence angle may be used, which may also provide an algorithm which is easy to evaluate. In further embodiments, any suitable geometric shape and light incidence angle may be used.

At stage 62, the adjustment circuitry 44 receives the transmission color determined at stage 60 and the color limit determined at stage 56. The adjustment circuitry 44 uses the transmission color and the color limit to determine a reflection color for the selected element. It is intended that a GI rendering using the reflection color in combination with the transmission color will produce a similar result to a DVR rendering using the preset transfer function received at stage 60. The reflection color that is determined at stage 62 may be a reflection color that provides a most similar result to the DVR rendering, while also obeying the constraint provided by the color limit determined at stage 56.

It may be considered that reflection is essentially multiplicative, such that an output color multiplied by a reflection color may provide the same result as if reflection were included in a rendering process used to obtain the output color. Therefore, at stage 62, the adjustment circuitry 44 multiplies the pixel color obtained in stage 60 by a candidate reflection color, and adjusts the candidate reflection color until a combined color obtained by the multiplication is as close as possible to a color that would be obtained by DVR rendering using the preset transfer function. In other embodiments, any suitable method may be used to obtain the reflection color.

In a simple case in which reflection is multiplied with transmission, a multiplication process may be reversed to obtain a reflection color that, when multiplied the transmission color, results in a color similar to that obtained using an original DVR transfer function. For example, a candidate reflection color may be obtained using Equation 5:

$$C_{candidate} = \frac{C_{src}}{\max\left(10^{-6}, C_{transmission}\right)} \quad \text{(Equation 5)}$$

in which $C_{candidate}$ is a candidate reflection color, $C_{src}$ is a source color from the DVR preset transfer function, and $C_{transmission}$ is a color obtained using transmission only.

To obtain a value of the correct magnitude, the candidate reflection color may be normalized to a magnitude of 1 as in Equation 6 below:

$$C_{ref} = \frac{C_{candidate}}{\max_{rgb}(C_{candidate})} \quad \text{(Equation 6)}$$

where $C_{ref}$ is the reflection color and $\max_{rgb}$ is a maximum of the R, G and B channels of $C_{candidate}$.

In other embodiments, any suitable strategy may be used to optimize a reflection color. For example, a least square optimization may be performed using a color difference magnitude measure, for example vector magnitude of the color vector.

In the adjustment of the candidate reflection color, the adjustment circuitry 44 does not allow the candidate reflection color to be below the color limit determined at stage 56.

When the adjustment circuitry 44 has obtained the closest possible combined color, the adjustment circuitry 44 outputs a determined value for reflection color, where the determined color for reflection color is the value for the candidate reflection color that provided the closest possible combined color.

At the end of stage 62, both a transmission color and a reflection color for the selected element have been determined. The transmission color is the transmission color determined at stage 58 and used in the lighting simulation of stage 60. The reflection color is the reflection color determined at stage 62.

The adjustment circuitry 44 stores the determined transmission color for the selected element in a transfer function relating to transmission color, which may be referred to as a transmission transfer function. The adjustment circuitry 44 stores the determined reflection color in a transfer function relating to reflection color, which may be referred to as a reflection transfer function. The transmission transfer function and reflection transfer function are for use in global illumination.

At stage 64, the adjustment circuitry 44 determines whether there are any elements of the preset transfer function that have not yet been selected. If there are any elements of the preset transfer function that have not yet been selected, the method of FIG. 3 returns to stage 52 and another element is selected.

If there is no element of the preset transfer function that has not yet been selected, the method of FIG. 3 ends at stage 66. The adjustment circuitry 44 outputs the transmission transfer function, which includes a respective transmission color for each of a plurality of elements. The adjustment circuitry 44 outputs the reflection transfer function, which includes a respective reflection color for each of the plurality of elements. The transmission transfer function and reflection transfer function have been determined as described above with reference to FIG. 3.

Although certain stages are described above in relation to FIG. 3, in other embodiments one or more of said stages may be omitted. For example, a saturation constraint on the transmission color and/or the reflection color may be omitted. A stage of adjusting colors to avoid corner cases may be omitted. An adjustment of color based on opacity may be omitted.

In the method of FIG. 3, values for the transmission transfer function and reflection transfer function are calculated for every individual element. In other embodiments, values for the transmission transfer function and reflection transfer function are calculated for a subset of the elements, for example for a predetermined set of control points. The adjustment circuitry 44 then uses the calculated values to obtain values for other elements, for example by interpolation.

The method of FIG. 3 is described in terms of a transmission transfer function. In other embodiments, an extinction transfer function is determined instead of a transmission function. The extinction transfer function represents an amount of light that is not transmitted.

An aim of the method of FIG. 3 is to convert a preset transfer function used for DVR rendering into a transmission transfer function or extinction transfer function and reflection transfer function for use in GI illumination, wherein the conversion is performed in such a way as to result in good global illumination images.

The method of FIG. 3 may provide an algorithmic method to convert existing presets to global illumination presets while including additional constraints and methodology that are appropriate to a global illumination rendering mode. An existing preset may be converted automatically or semi-automatically to a pair of presets that provide good images in global illumination. Transmission may be set first, and then reflection color adjusted to achieve a desired appearance.

In some circumstances, the method of FIG. 3 may allow a user to achieve a good conversion of an existing preset even when the user is not an expert in the parameters used in global illumination and their adjustment. An existing preset look and feel may be converted in such a way as to provide a good quality result, for example good quality natural looking vessels.

Figure 5:
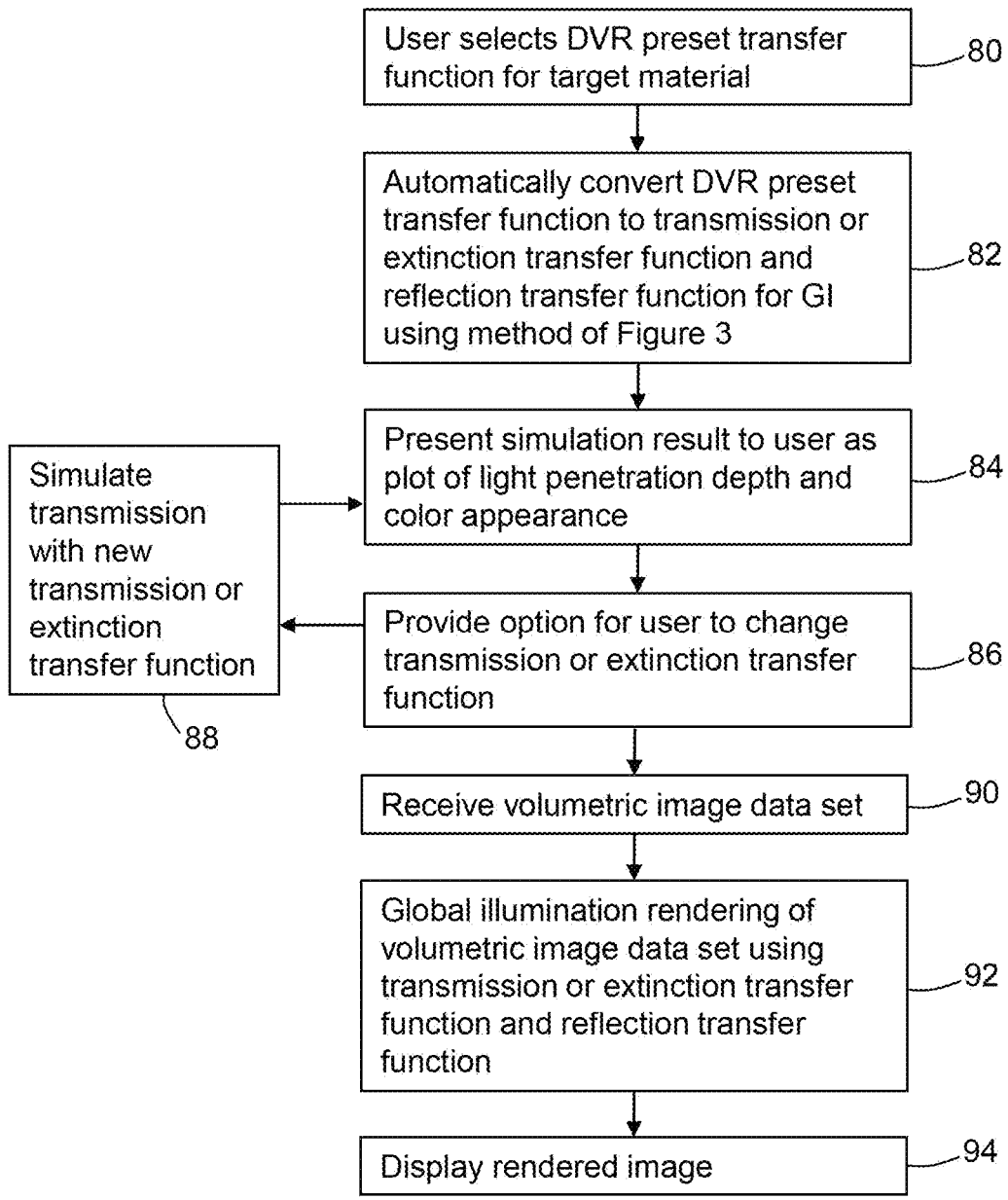
FIG. 5 is a flow chart illustrating in overview a method in accordance with an embodiment.

FIG. 5 is a flow chart illustration in overview a rendering method in accordance with an embodiment.

At stage 80 of FIG. 5, a user selects a DVR preset transfer function that is configured for rendering images of at least one target material, for example bone. The user provides a user input that is indicative of the selection, for example by selecting a preset on a drop down menu using a mouse, or typing using a keyboard. The adjustment circuitry 44 receives the selection of the DVR preset transfer function that has been input by the user.

At stage 82, the adjustment circuitry 44 and rendering circuitry 46 perform an automatic conversion of the DVR preset transfer function to obtain a transmission transfer function and a reflection transfer function using a method as described above with reference to FIG. 3. Alternatively, the adjustment circuitry 44 and rendering circuitry 46 perform an automatic conversion of the DVR preset transfer function to obtain an extinction transfer function and a reflection transfer function.

At stage 84, the display circuitry 48 displays to the user a color simulation image. The color simulation image shows the user an exemplary result of the simulation performed at stage 60 of FIG. 3. In the present embodiment, the color simulation image comprises a plot of light penetration depth and color appearance, and bars showing attenuation at selected individual intensity values. In other embodiments, any suitable color simulation image may be used.

Figure 6:
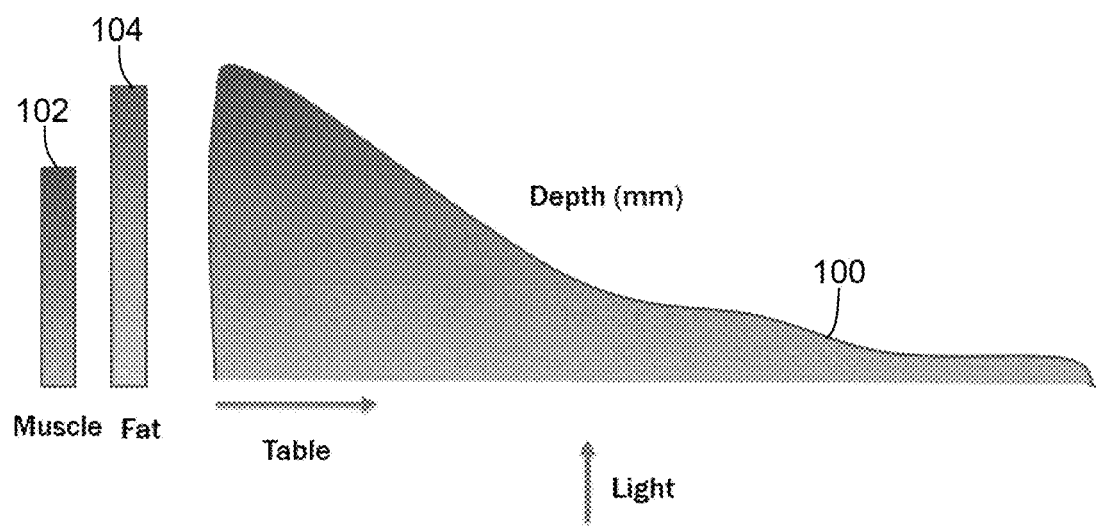
FIG. 6 is a schematic illustration representing a display of colors to a user.

The plot comprises a wedge 100 of light penetration depth and color appearance as illustrated in FIG. 6. FIG. 6 is shown in greyscale for reasons of reproduction, but in practice may comprise a range of RGB colors. Colors of the wedge are obtained by performing the simulation of stage 60 for each element.

A horizontal direction of the wedge 100, which is shown in FIG. 6 as 'Table' direction, is representative of intensity values. Intensity values of all the elements in transmission transfer function and reflection transfer function are represented by the wedge 100.

The wedge 100 is represented as being illuminated by light coming in a vertically upwards direction, which is represented as a 'Light' direction in FIG. 6.

In the wedge 100, RGB color values change with intensity values. RGB color values also change with distance from a notional surface which is at the bottom of the wedge 100. At each intensity value, a height of the wedge 100 is representative of a depth at which most of the light has been absorbed. A depth at which most of the light has been absorbed varies with opacity. Color darkens with distance from the notional surface. Color may go to black or to near black along the upper edge of the wedge.

It is noted that changing color due to attenuation of tight with depth in the material is a property of global illumination rendering. In an example of DVR rendering performed using the preset transfer function, color does not change as light is attenuated.

In the embodiment of FIG. 5 and FIG. 6, examples of particular elements are also displayed to highlight realism of the colors obtained in the simulation. Elements may be chosen that correspond to real life tissues or other materials. In FIG. 6, a first bar 102 comprises an attenuation profile for a first intensity value that is typical of muscle. A user may see how a color used to render muscle varies with depth in the material. A second bar 104 comprises an attenuation profile for a second, different intensity value that is typical of fat. A user may see how a color used to render fat varies with depth in the material.

The presentation of color in the wedge 100 and/or bars 102, 104 may allow a user to determine whether they are happy with the colors obtained by automatic conversion of the preset transfer function. By presenting results of the lighting simulation to the user, the user may obtain more insight into the process used to convert the user's selected DVR preset into global illumination transfer functions.

In other embodiments, any suitable display method may be used to display colors obtained using the transmission or extinction transfer function. For example, colors may be displayed using any of the display methods as described in U.S. patent application Ser. No. 15/383,114, which is hereby incorporated by reference.

At stage 86, the display circuitry 48 provides the user with the option to change the transmission or extinction transfer function. If the user wishes to change the transmission or extinction transfer function, the user may input a change using any suitable input method. For example, the user may request that one or more colors are changed by a given absolute or percentage value. The user may input one or more colors using a color picker or slider. If the user has made a change, the adjustment circuitry 44 receives the input of a change from the user and adjusts the transmission or extinction transfer function in accordance with the user's input to obtain an adjusted transmission or extinction transfer function.

The method of FIG. 5 then proceeds to stage 88. At stage 88, the adjustment circuitry 44 passes the adjusted transmission or extinction transfer function to the rendering circuitry 46. The rendering circuitry 46 re-runs a fighting simulation using the adjusted transmission or extinction transfer function. The method of FIG. 5 then returns to stage 84, at which the display circuitry 48 presents the simulation result of stage 88 to the user as a plot of light penetration depth and color appearance. The display circuitry 48 may also display bars that are representative of particular materials. The method of FIG. 5 then proceeds to stage 86 and the user is presented with the option to change the transmission or extinction transfer function.

If at any instance of stage 86 the user does not choose to change the transmission or extinction transfer function, the method of FIG. 5 proceeds to stage 90. At stage 90, the rendering circuitry 46 receives a volumetric image data set. The volumetric image data set is representative of a volume comprising at least one anatomical region of a patient or other subject. The anatomical region comprises at least one target material that the preset transfer function received at stage 80 is configured to render.

The volumetric image data set comprises respective intensity values for a plurality of voxels of the volumetric image data set. In the embodiment of FIG. 5, the volumetric image data set comprises CT data obtained by scanning a patient using the scanner 34. Each voxel has an associated intensity value that is representative of the attenuation of applied X-ray radiation provided at the location represented by the voxel. In other embodiments, the volumetric image data set may comprise data obtained using any suitable imaging modality.

At stage 92, the rendering circuitry 46 performs a global illumination rendering process to render an image from the volumetric image data set using a transmission or extinction transfer function and a reflection transfer function. The reflection transfer function is the reflection transfer function that was determined at stage 82. The transmission or extinction transfer function is the transmission or extinction transfer function that was determined at stage 82, or if a user adjustment has been performed the transmission or extinction transfer function is an adjusted transmission or extinction transfer function obtained in response to user input. An output of stage 92 is a set of second rendering data which is representative of pixels of an image and their associated pixel colors.

At stage 94, the display circuitry 48 displays the rendered image to the user, for example on display screen 36.

Optionally, the display circuitry 48 may also provide to the user a further opportunity for changing the transmission or extinction transfer function and/or the reflection transfer function. If the user changes the transmission or extinction transfer function and/or the reflection transfer function, the method of FIG. 5 may return to stage 92 to re-render an image using the changed transmission or extinction transfer function and/or the reflection transfer function. In other embodiments, the user may be given the opportunity to change the transmission or extinction transfer function and/or the reflection transfer function at any suitable point in the method of FIG. 5. In further embodiments, the user may not make any change to the transmission or extinction transfer function and/or the reflection transfer function. The conversion of the transfer functions may be performed purely automatically.

In further embodiments, transfer functions may be obtained using the method of FIG. 3 without receiving changes from the user and/or without display of results of the lighting simulation to the user and/or without rendering an image using the transfer functions. For example, existing DVR presets may be converted automatically to GI presets using the method of FIG. 3.

By converting a preset transfer function in accordance with the method of FIG. 3 and using the converted preset transfer function to render an image, a good global illumination image may be obtained.

In one example, a cardiac preset is converted to global illumination transfer functions using the method of FIG. 3, and the resulting transfer functions are used to render a first image of a heart. For comparison, the cardiac preset is also converted to global illumination transfer functions using a naïve approach, and the transfer functions resulting from the naïve conversion are used to render a second image of the same heart. A third image of the same heart is rendered by DVR using the original cardiac preset.

It is found that the conversion using the method of FIG. 3 keeps deep saturated colors, and allows for a color contrast between lit and unlit areas. A lit side of the heart is much paler that an opposite attenuated side. The attenuated side of the heart matches a deep red color seen in a DVR image rendered using the original cardiac preset. In the image rendered using presets converted using the method of FIG. 3, a translucent effect correctly matches a translucent effect obtained in a DVR image rendered using the original cardiac preset. When the naïve approach is used to perform the conversion, the translucent effect is desaturated due to an inappropriate split between transmission and reflection, and the translucent material has an unexpectedly dark appearance.

In another example, an angio preset that is configured for rendering angiography images is converted to global illumination transfer functions using the method of FIG. 3, and the resulting transfer functions are used to render a first image of a ankle. For comparison, the angio preset is also converted to global illumination transfer functions using a naïve approach, and the transfer functions resulting from the naïve conversion are used to render a second image of the same ankle. A third image of the same ankle is rendered by DVR using the original angio preset. It is found that a translucent effect in the first image correctly matched a corresponding translucent effect in the third image. Translucent areas in the first image are made as saturated as possible. In the second image, which is rendered using the naïve conversion of the preset, the translucent effect is desaturated due to an inappropriate split between transmission and reflection. Harsh transmission settings cause sharp and/or aliased image features in the second image.

In embodiments described above, a single DVR transfer function is converted into a single transmission or extinction transfer function and a single reflection transfer function. In some other embodiments, a DVR preset may comprise more than one transfer function. For example, different materials or regions may be segmented in a volumetric image data set, and the DVR preset may comprise a plurality of transfer functions for use in rendering the different materials or regions. In such embodiments, each of the plurality of transfer functions in the DVR preset may be converted to a respective transmission or extinction transfer function and a respective reflection transfer function, for example using a method as described above with reference to FIG. 3. The resulting transmission or extinction transfer functions and reflection transfer functions may be used to render a volumetric image data set after a segmentation process is performed on the volumetric image data set to segment the different materials and/or regions.

Embodiments described above comprises determining transfer functions for rendering a volumetric medical image data set, for example a CT data set. In other embodiments, any suitable medical image data set may be used, which may be of any suitable modality or modalities. The medical image data set may be representative of any human or animal subject. In further embodiments, transfer functions may be configured for rendering any suitable image data, which may not be medical.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising processing circuitry configured to:
   receive a selection of a preset transfer function that sets colors used in volume rendering, wherein the preset transfer function is selected for use in rendering at least one target material;
   determine a first transfer function relating to transmission or extinction color, wherein the determining of the first transfer function is based on the preset transfer function;
   generate first rendering data based on transmission or extinction color by using the first transfer function; and determine a second transfer function relating to reflection color, wherein the determining of the second transfer function is based on the first rendering data, wherein the first transfer function and second transfer function are for use in global illumination rendering, the generating of the first rendering data comprises conducting at least one lighting simulation based on the first transfer function, and the at least one lighting simulation comprises a respective lighting simulation for each of a plurality of elements in the first transfer function, each element corresponding to a respective intensity value.

2. An apparatus according to claim 1, wherein the processing circuitry is further configured to:

receive volume data for volume rendering, wherein the volume data is representative of a region comprising the at least one target material; and perform a global illumination rendering process on the volume data using the first transfer function and second transfer function to obtain second rendering data, thereby to obtain a rendered image.

3. An apparatus according to claim 1, wherein each lighting simulation comprises simulation of attenuation of light by transmission through a geometric shape.

4. An apparatus according to claim 3, wherein the geometric shape comprises a rounded corner.

5. An apparatus according to claim 3, wherein the light is incident at a predetermined angle relative to the geometric shape.

6. An apparatus according to claim 5, wherein the predetermined angle is 45 degrees or 90 degrees.

7. An apparatus according to claim 1, wherein each lighting simulation comprises analytical evaluation of a fixed rendering integral.

8. An apparatus according to claim 1, wherein the processing circuitry is further configured to display to a user a representation of color attenuation and/or light penetration depth for a selected intensity value, wherein the representation is based on the first rendering data.

9. An apparatus according to claim 1, wherein the preset transfer function is configured for use in shaded volume rendering.

10. An apparatus according to claim 1, wherein the at least one target material comprises at least one of: tissue, bone, vessel, organ.

11. A medical image processing apparatus comprising processing circuitry configured to:

receive a selection of a preset transfer function that sets colors used in volume rendering, wherein the preset transfer function is selected for use in rendering at least one target material;

determine a first transfer function relating to transmission or extinction color, wherein the determining of the first transfer function is based on the preset transfer function;

generate first rendering data based on transmission or extinction color by using the first transfer function;

determine a second transfer function relating to reflection color, wherein the determining of the second transfer function is based on the first rendering data, and display to a user a plot of color attenuation and/or light penetration depth against intensity value, wherein the plot is based on the first rendering data, wherein the first transfer function and second transfer function are for use in global illumination rendering.

12. A medical image processing apparatus comprising processing circuitry configured to:

receive a selection of a preset transfer function that sets colors used in volume rendering, wherein the preset transfer function is selected for use in rendering at least one target material;

determine a first transfer function relating to transmission or extinction color, wherein the determining of the first transfer function is based on the preset transfer function;

generate first rendering data based on transmission or extinction color by using the first transfer function; and determine a second transfer function relating to reflection color, wherein the determining of the second transfer function is based on the first rendering data, wherein the first transfer function and second transfer function are for use in global illumination rendering, and the determining of the first transfer function comprises applying a first saturation constraint to color values in the first transfer function.

13. An apparatus according to claim 12, wherein the applying of the first saturation constraint comprises adjusting saturation of at least some color values in the first transfer function, wherein the adjusting of the saturation is based on opacity.

14. A medical image processing apparatus comprising processing circuitry configured to:

receive a selection of a preset transfer function that sets colors used in volume rendering, wherein the preset transfer function is selected for use in rendering at least one target material;

determine a first transfer function relating to transmission or extinction color, wherein the determining of the first transfer function is based on the preset transfer function;

generate first rendering data based on transmission or extinction color by using the first transfer function; and determine a second transfer function relating to reflection color, wherein the determining of the second transfer function is based on the first rendering data, wherein the first transfer function and second transfer function are for use in global illumination rendering, and the determining of the second transfer function comprises applying a second saturation constraint to color values in the second transfer function.

15. An apparatus according to claim 14, wherein the applying of the second saturation constraint comprises setting a respective color limit for each of a plurality of color values in the reflection transfer function, wherein the setting of the color limits is based on opacity.

16. An apparatus according to claim 15, wherein the setting of the color limits comprises applying a respective saturation margin to each of the plurality of color values in the reflection transfer function, wherein the saturation margins are dependent on opacity.

17. A medical image processing apparatus comprising processing circuitry configured to:

receive a selection of a preset transfer function that sets colors used in volume rendering, wherein the preset transfer function is selected for use in rendering at least one target material;

determine a first transfer function relating to transmission or extinction color, wherein the determining of the first transfer function is based on the preset transfer function;

generate first rendering data based on transmission or extinction color by using the first transfer function;

determine a second transfer function relating to reflection color, wherein the determining of the second transfer function is based on the first rendering data; and identify any color values in the preset transfer function having at least one color channel that is below a minimum color value or above a maximum color channel, and adjust the identified color values such that each color channel is between the minimum color value and maximum color value over a predetermined range of saturation, wherein the first transfer function and second transfer function are for use in global illumination rendering.

18. A method comprising:

receiving a selection of a preset transfer function that sets colors used in volume rendering, wherein the preset transfer function is selected for use in rendering at least one target material;

determining a first transfer function relating to transmission or extinction color, wherein the determining of the first transfer function is based on the preset transfer function;

generating first rendering data based on transmission or extinction color by using the first transfer function; and determining a second transfer function relating to reflection color, wherein the determining of the second transfer function is based on the first rendering data, wherein the first transfer function and second transfer function are for use in global illumination rendering, the generating of the first rendering data comprises conducting at least one lighting simulation based on the first transfer function, and the at least one lighting simulation comprises a respective lighting simulation for each of a plurality of elements in the first transfer function, each element corresponding to a respective intensity value.

* * * * *